Figure 1A:
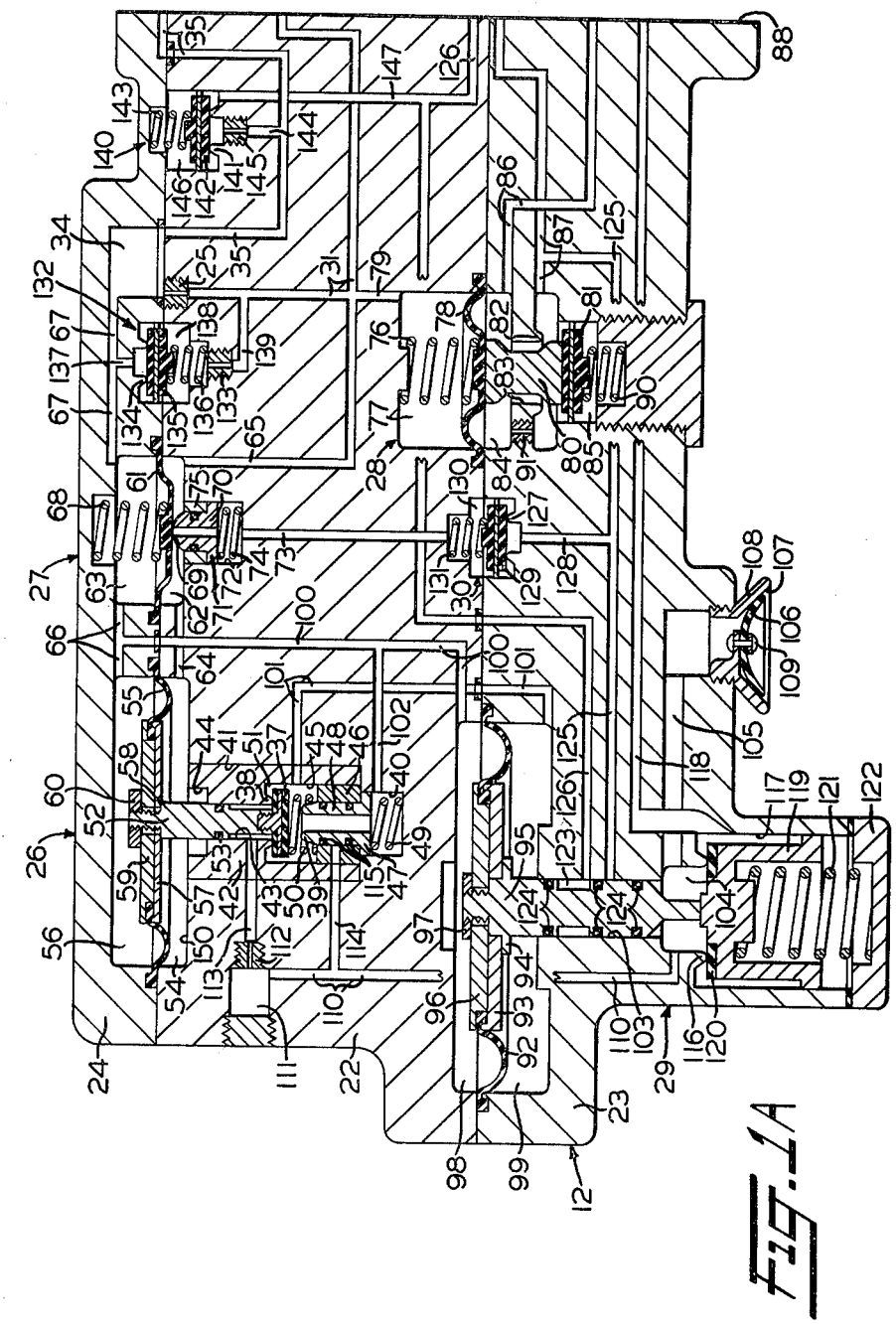

United States Patent [19]

Hart

[11] 4,043,605

[45] Aug. 23, 1977

[54] EMERGENCY PORTION FOR A BRAKE CONTROL VALVE

[75] Inventor: James E. Hart, Trafford, Pa.

[73] Assignee: Westinghouse Air Brake Company, Wilmerding, Pa.

[21] Appl. No.: 758,046

[22] Filed: Jan. 10, 1977

[51] Int. Cl.² ............................................. B60T 15/30
[52] U.S. Cl. ........................................ 303/37; 303/42; 303/81
[58] Field of Search ................................... 303/35–39, 303/42, 43, 75, 77, 80, 81, 85

[56] References Cited

U.S. PATENT DOCUMENTS

| 2,031,213 | 2/1936 | Farmer | 303/35 |
|---|---|---|---|
| 3,232,678 | 2/1966 | Wilson | 303/80 |

Primary Examiner—Duane A. Reger
Attorney, Agent, or Firm—W. F. Poore; R. W. McIntire, Jr.

[57] ABSTRACT

An inexpensive emergency valve device embodies a first movable abutment, subject on its respective opposite sides to the pressures in a brake pipe and a quick action chamber, that, upon a service rate of reduction of brake pipe pressure, unseats a poppet valve from one of two valve seats between which it is disposed so that, while unseated from both valve seats, fluid can flow at a service rate from the quick action chamber, one side of the first abutment and both sides of a second abutment, operatively connected to a combined emergency and brake pipe vent valve to atmosphere so long as brake pipe pressure is reduced at a service rate thereby preventing an emergency brake application. Upon an emergency rate of reduction of brake pipe pressure, the quick action chamber pressure acting on the one side of the first abutment shifts the poppet valve into seating engagement with the other valve seat to cut off flow from the quick action chamber and one side of the second abutment to atmosphere whereupon the pressure of the trapped fluid under pressure on the one side of the second abutment deflects it to unseat the brake pipe vent valve to cause an emergency brake application.

10 Claims, 6 Drawing Figures

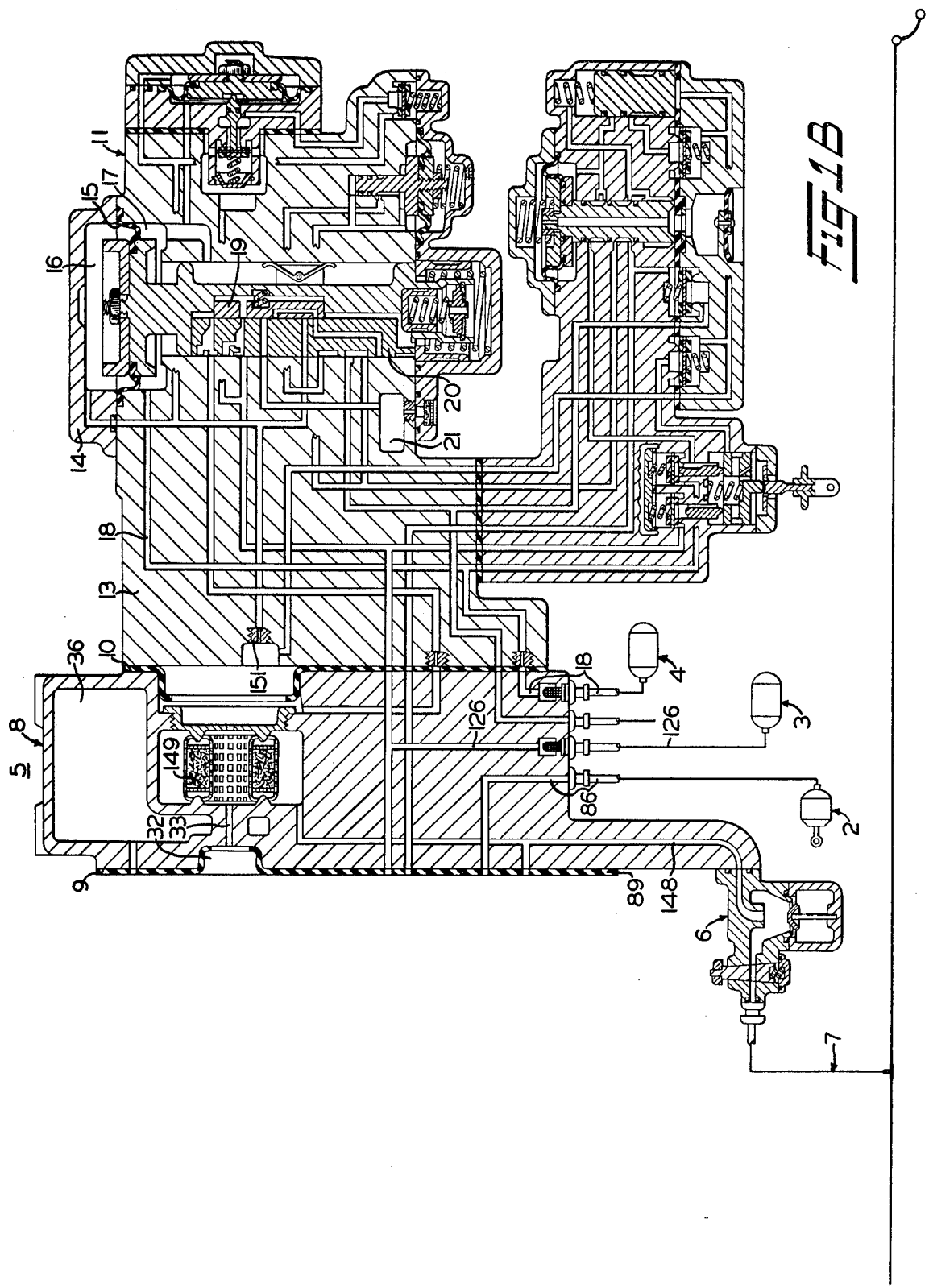

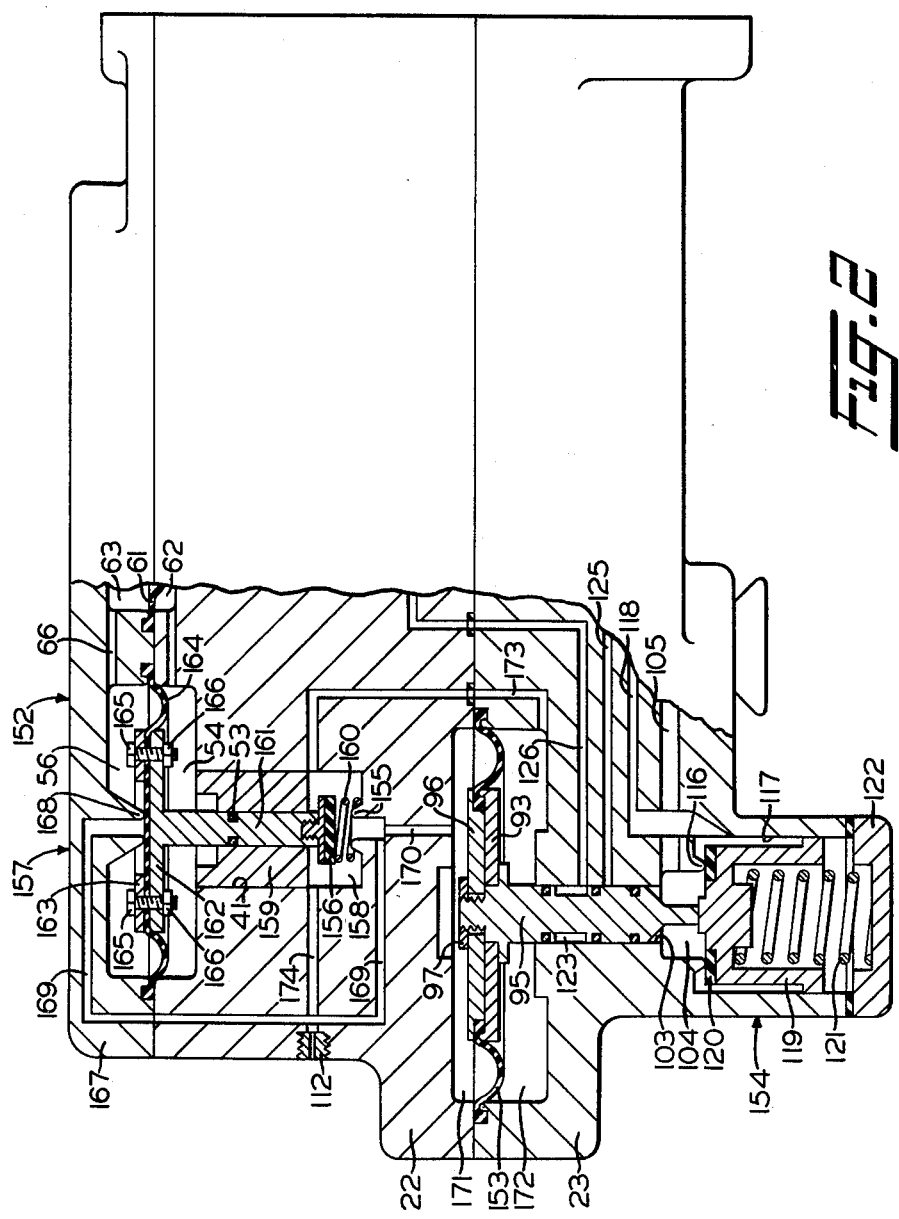

EMERGENCY PORTION FOR A BRAKE CONTROL VALVE

BACKGROUND OF THE INVENTION

In Pat. No. 3,232,678, issued Feb. 1, 1966 to William G. Wilson, and assigned to the assignee of the present application, there is shown and described a brake control valve device that is substantially the same in function and operation as the brake control valve device included in the standard fluid pressure brake apparatus now in use on railway freight cars owned and operated by American railroads. The brake control valve device shown in the above-mentioned U.S. Pat. No. 3,232,678 comprises a service valve portion embodying therein a plurality of slide, spool and disc type valves, and an emergency valve portion that has a slide-type emergency valve slidable on a flat ported valve seat and a graduating valve slidably mounted on a flat ported surface provided therefor on the side of the emergeny slide valve opposite the side thereof that engages the flat ported valve seat. This emergency valve portion is operative in response to a service rate or reduction of pressure in a train brake pipe to release fluid under pressure from a quick action chamber to atmosphere at a service rate thereby rendering this emergency valve portion effective to cause an emergency brake application only in response to an emergency rate of reduction of pressure in the train brake pipe.

The manufacture and production of these slide-type valves and valve seats of this emergency valve portion require considerable accurate and skillful machining which, as is readily apparent, increases the cost of the emergency valve portion of which they are an essential component.

Accordingly, it is the general purpose of this invention to provide a railway car brake control valve device with a novel emergency valve portion that embodies a first movable abutment, subject on its respective opposite sides to pressure in a train brake pipe and in a quick action chamber that is effective, upon a service rate of reduction of the pressure in the train brake pipe, to unseat a poppet-type valve from one of two coaxial spaced-apart valve seats between which it is disposed so that, while unseated from both valve seats, fluid under pressure is released at a service rate from the quick action chamber, one side of the first abutment and both sides of a second abutment, operatively connected to a combined emergency and brake pipe vent valve, to atmosphere simultaneously as the pressure in the train brake pipe is reduced at a service rate thereby preventing an emergency brake application. Upon an emergency rate of reduction of the pressure in the train brake pipe, the pressure of the fluid in the quick action chamber and acting on the one side of the first abutment shifts the poppet valve into seating engagement with the other valve seat to cut off flow of fluid under pressure from the quick action chamber and one side of the second abutment to atmosphere. The trapped fluid under pressure in the quick action chamber and acting on the one side of the second abutment then deflects this abutment to shift the combined emergency and brake pipe vent valve to a position in which fluid under pressure is released from the brake pipe at an emergency rate to cause an emergency brake application and an emergency reservoir is connected to a brake cylinder.

SUMMARY OF THE INVENTION

According to the present invention, a railway freight car brake control valve device that includes a service valve portion and a pipe bracket that are substantially the same as the service valve portion and pipe bracket shown in the above-mentioned U.S. Pat. No. 3,232,678, and a novel emergency valve portion which is secured to this pipe bracket whereby there is provided a brake control valve device, the the novel emergency valve portion of which embodies therein a quick action chamber breather valve device and a combined emergency and brake pipe vent valve device so interlocked that the breather valve device is effective to release fluid under pressure from the quick action chamber at a service rate and prevent operation of the combined emergency and brake pipe vent valve so long as fluid under pressure is released from a train brake pipe at a service rate thereby preventing operation of this novel emergency valve portion to cause an undesired emergency brake application.

The quick action chamber breather valve device comprises an abutment that is subject on its respective opposite sides to the pressure in the train brake pipe and in the quick action chamber and a poppet-type valve that is disposed between two coaxial spaced-apart annular valve seats.

The combined emergency and brake pipe vent valve device comprises an abutment that is normally subject on its respective opposite sides to the pressure in the quick action chamber, a spool-type valve for controlling flow of fluid under pressure from an emergency reservoir to a brake cylinder and a brake pipe vent valve normally seated by a spring.

While the pressure in the quick action chamber and the brake pipe are equal, another spring is effective to seat the poppet-type valve of the breather valve device on one of its seats and unseat it from the other to enable flow of fluid under pressure from the quick action chamber to both sides of the diaphragm of the combined emergency and brake pipe vent valve device to thereby enable the spring to seat the brake pipe vent valve on its seat and shift the spool-type valve to a position in which the emergency reservoir is cut off from the brake cylinder.

When fluid under pressure is released at a service rate from the train brake pipe and one side of the abutment that operates the breather valve, this abutment effects shifting of the poppet valve out of engagement with one of its valve seats and to a position in which it is unseated from both of its seats in which position fluid under pressure is released at a service rate from the quick action chamber, the other side of this abutment of the breather valve and both sides of the abutment of the vent valve to atmosphere via a choke the size of which provides the service rate of release thereby preventing operation of the vent valve device to effect an emergency brake application.

However, when fluid under pressure is released from the train brake pipe at an emergency rate, this faster release of fluid under pressure from the one side of the abutment that operates the breather valve device causes this abutment to shift the poppet-type valve into engagement with its other valve seat thereby cutting off the release of fluid under pressure from one side of the abutment of the vent valve. The quick action chamber pressure thus retained on the one side of this abutment deflects it to cause unseating of the vent valve from its seat to release fluid under pressure from the brake pipe at an emergency rate and shifting of the spool-type valve to a position to connect the emergency reservoir to the brake cylinder thereby providing an emergency brake application.

In the accompanying drawings:

FIG. 1A and FIG. 1B, taken together, constitute a diagrammatic view, in section, of an improved brake control valve device embodying the invention.

FIG. 2 is a partial diagrammatic view, in section, of an emergency valve portion constructed in accordance with a second embodiment of the invention.

DESCRIPTION — FIGS. 1A AND 1B

As shown in FIGS. 1A and 1B of the drawings, when the right-hand edge of FIG. 1A is placed along side of the left-hand edge of FIG. 1B, an improved freight car fluid-pressure-operated brake apparatus embodying the invention comprises a brake pipe 1 that extends from one end of the car to the other, a brake cylinder 2, an emergency or supplemental reservoir 3, an auxiliary reservoir 4, and a brake control valve device 5 connected to the brake pipe 1 through a combined cut-out cock and centrifugal dirt collector 6 and a branch pipe 7.

The brake control valve device 5 may comprise a pipe bracket 8 having gasket faces 9 and 10 disposed opposite each other, a service or triple valve device or portion 11 and a novel emergency valve device or portion 12.

The service valve portion 11 and pipe bracket 8 shown in FIG. 1B of the drawings may be substantially the same in construction and operation as the service valve portion 7 and pipe bracket 6 shown and described in the above-mentioned U.S. Pat. No. 3,232,678. Since reference may be had to this patent for a complete description of the structure and operation of this service valve portion and pipe bracket, it is deemed unnecessary to describe them in detail herein. Briefly, however, the service valve portion 11 comprises a sectionalized casing 13 between which and a cover member 14, secured thereto by any suitable means (not shown), is clamped to the outer periphery of a diaphram 15 subject opposingly on its opposite sides to brake pipe pressure in a chamber 16 at the upper side of this diaphram and to the pressure in the auxiliary reservoir 4 connected to a chamber 17 at the lower side of this diaphram by a pipe and correspondingly numbered passageway 18 that extends through the pipe bracket 8 and the sectionalized casing 13. Operatively connected to the diaphram 15 is a service graduating valve 19 and a service slide valve 20 for respectively controlling the release of fluid under pressure from the brake pipe 1 to a quick service volume 21 and the supply of fluid under pressure from the auxiliary reservoir 4 to the brake cylinder 2 in response to variations in brake pipe pressure, as disclosed in the above-mentioned U.S. Pat. No. 3,232,678.

The novel emergency valve portion 12 shown in FIG. 1A of the drawings has a sectionalized casing comprising an upper casing section 22, a lower casing section 23 secured thereto by any suitable means (not shown), and a top cover member 24 that is secured to the casing section 22 by any suitable means (not shown).

As shown in FIG. 1A of the drawings, the emergency valve portion 12 comprises a quick action chamber charging choke 25, a combined quick action chamber breather and cut-off valve device 26, an emergency accelerated release valve device 27, an inshot valve device 28, a combined emergency and brake pipe vent valve device 29, and an emergency accelerated release check valve device 30.

The quick action chamber charging choke 25 is provided with external screw threads to enable it to be removably carried in the upper end of the upper casing section 22 at one end of a passageway 31 that extends through this casing section 22 and at its other end opens into a chamber 32 (FIG. 1B) formed in the pipe bracket 8. Also opening into the chamber 32 is one end of a passageway 33 that is connected to the brake pipe 1 in the manner described in the hereinbefore-mentioned U.S. Pat. No. 3,232,678.

As may be seen from FIG. 1A, the choke 25 restricts the flow of fluid under pressure from the passageway 31 and, therefore, the brake pipe 1 to a chamber 34 formed in the top cover 24. Opening into this chamber 34 is one end of a passageway that extends through the casing section 22 and pipe bracket 8 (FIG. 1B) to a quick action chamber 36 formed in this pipe bracket. From the foregoing, it is apparent that the quick action chamber 36 is charged with fluid under pressure from the brake pipe 1 via the choke 25 (FIG. 1A) which in actual practice or, in other words, in heretofore constructed railway freight car brake control valve devices, has a diameter of .0200 inch.

As shown in FIG. 1A, the combined quick action chamber breather and cut-off valve device 26 comprises a flat disc poppet-type valve 37 that has some suitable resilient material such as, for example, rubber bonded to each side thereof to provide seating surfaces for engagement with an upper annular valve 38 or a lower annular valve seat 39.

The casing section 22 is provided with a bottomed bore 40 and a coaxial counterbore 41. A bushing 42 having a bore 43 at the lower end of which is formed the upper annular valve seat 38 is press-fitted into the counterbore 41. Extending inward from the respective opposite ends of the bushing 42 are a pair of counterbores 44 and 45 that are coaxial with the bore 43. A bushing 46 is press-fitted into the lower end of the counterbore 45 in order that this bushing 46 may provide a stop for an out-turned flange 47 that is formed integral with the lower end of a hollow cylindrical member 48 that has the lower annular valve seat 39 formed on its upper end. The diameter of the out-turned flange 47 is slightly less than that of the bottomed bore 40 between the bottom of which and this flange 47 is interposed a spring 49 that resiliently biases this flange 47 against the lower end of the bushing 46.

Since the lower side of the valve 37 may be covered with rubber, as described above, when this valve 37 is moved against the valve seat 39 which is metal, this seat 39, the cylindrical member 48 and flange 47 can move downward slightly against the yielding resistance of the spring 49 to prevent damage to the rubber on the lower side of the valve 37.

The valve 37 is normally biased against the upper valve seat 38 by a spring 50 that is interposed between the lower side of this valve 37 and the upper end of the bushing 46 to close communication between a chamber 51 within the counterbore 45 and the interior of the bore 43 that intermediate its ends is open to atmosphere in a manner that will be hereinafter made apparent.

The valve 37 may be unseated from the upper annular valve seat 38 by a valve operating stem 52 that is slidably mounted in the bore 43. The lower portion of the valve stem 52 is fluted and is provided just above this fluted portion with a peripheral annular groove in which is carried an O-ring seal 53 that forms a seal with the wall surface of the bore 43 to prevent leakage of fluid under pressure from a chamber 54 beneath a movable abutment in the form of an annular diaphragm 55, the outer periphery of which is clamped between the casing section 22 and top cover 24 that cooperates with this diaphragm 55 to form on the upper side thereof a chamber 56.

The inner perphery of the diaphragm 55 is clamped between a diaphragm follower 57 that rests against a shoulder 58 formed on the valve operating stem 52 and an annular diaphragm follower plate 59 by a nut 60 that has screw-threaded engagement with external threads provided therefor on the stem 52.

The emergency accelerated release valve device 27 comprises an annular resilient diaphragm-type valve 61 that has its outer periphery clamped between the casing section 22 and the top cover member 24. This diaphragm valve 61 cooperates with the casing section 22 and top cover member 24 to form on the respective opposite sides of this diaphragm valve 61 a pair of chambers 62 and 63. Opening into the chamber 62 is one end of a first passageway 64 that extends through the casing section 22 and at its other end opens into the chamber 54 below the diaphragm 55. Also, opening into the chamber 62 is one end of a second passageway 65 that extends through the casing section 22 and at its opposite end opens into the hereinbefore-mentioned passageway 31 that is connected to the brake pipe 1.

Opening into the chamber 63 above the diaphragm valve 61 is one end of a first passageway 66 that extends through the top cover member 24 and at its other end opens into the chamber 56 above the diaphram 55.

Moreover, opening into the chamber 63 is one end of a second passageway 67 that extends through the top cover member 24 and at its other end opens into the hereinbefore-mentioned chamber 34 that is connected by the passageway 35 to the quick action chamber 36 (FIG. 1B).

From the foregoing, it is apparent that the pressure in the chambers 54 and 62 (FIG. 1A) is the same as that in the train brake pipe 1, and that the pressure in the chambers 56, 63 and 34 is the same as that in the quick action chamber 36 which is charged from the brake pipe 1 via the quick action chamber charging choke 25.

Therefore, when the train brake pipe 1 is charged to the normal pressure carried therein and the brakes are released, the pressure in the chambers 34, 54, 56, 62, 63 and the quick action chamber 36 is the same as that in the train brake pipe 1 which may be, for example, seventy pounds per square inch.

Disposed in the chamber 63 and interposed between the top cover member 24 and the upper side of the diaphragm valve 61 is a spring 68 that acts in a downward direction to force the lower side of this diaphragm valve 61 into engagement with an annular valve seat 69 that is formed at the upper end of a movable hollow cylindrical member 70.

Since the diaphragm valve 61 is constructed of some resilient material such as, for example, rubber, and the cylindrical member 70 and the valve seat 69 thereon are constructed of metal, such as, for example, steel, in order to prevent damage to the diaphragm valve 61, the lower end of the cylindrical member 70 is provided with an out-turned flange 71 the diameter of which is such as to provide a sliding fit within a counterbore 72 that is coaxial with a bore 73 that extends through the casing section 22. A spring 74 disposed in the counterbore 72 is interposed between the bottom of this counterbore 72 and the flange 71 which is normally biased by this spring against the lower end of a bushing 75 that is pressed into the upper end of the counterbore 72 subsequent to placing the spring 74 and the cylindrical member 70 in this counterbore 72 with the out-turned flange 71 on the lower end of this member 70 in abutting relation with the upper end of the spring 74.

From the foregoing, it is apparent that the spring 74 is normally effective to resiliently bias the valve seat 69 upward against the lower side of the diaphragm valve 61 which is subject on its upper side to the force of the spring 68 which must be lighter than the spring 74.

The inshot valve device 28 may be substantially the same as the inshot valve mechanism 52 shown and described in U.S. Pat. No. 2,106,491, issued Jan. 25, 1938 to Everette P. Sexton and assigned to the assignee of the present invention. This inshot valve device 28 shown in FIG. 1A of the drawings in the present application differs from the inshot valve mechanism 52 shown in U.S. Pat. No. 2,106,491 by the addition of a spring 76 disposed in a chamber 77 above a diaphragm 78. Opening into the chamber 77 is one end of a passageway 79 that extends through the casing section 22 and at its other end opens into the hereinbefore-mentioned passageway 31 that is connected to the brake pipe 1.

Briefly, the force of the spring 76 and brake pipe pressure in the chamber 77 acting on the diaphragm 78 are normally effective, via a fluted stem 80, to unseat a disc valve 81 from an annular valve seat 82 formed at the lower end of a bore 83.

While the valve 81 is unseated from the seat 82, the bore 83 provides an unrestricted communication between a chamber 84 below the diaphragm 78 and a chamber 85 in which is disposed in the disc valve 81. The chamber 84 is connected to the brake cylinder (FIG. 1B) by a passageway and correspondingly numbered pipe 86. Opening into the chamber 85 is one end of a passageway 87 that extends through the casing section 23 to a gasket face 88 formed on the right-hand end of the casing section 23. A ported gasket 89 is disposed between the gasket face 88 on the casing section 23 and the gasket face 9 (FIG. 1B) on the pipe bracket 8. Consequently, one of the ports in this gasket 89 establishes a communication between the passageway 87 in the casing section 23 and a passageway in the pipe bracket 8 that corresponds to the passageway 72 shown in the hereinbefore-mentioned United States patent. As explained in this patent, fluid under pressure is supplied from the auxiliary reservoir 2 (in the patent) to this passageway 72 (in the patent) whenever a service brake application is effected. Accordingly, it is apparent that, likewise, fluid under pressure is supplied from the auxiliary reservoir 4 (FIG. 1B) to the passageway 87 (FIG. 1A) and thence to the chamber 84 via the bore 83 by operation of the service portion 11 (FIG. 1B) in response to a reduction of the pressure in the brake pipe 1 at a service rate. Since the chamber 84 is connected to the brake cylinder 2 (FIG. 1B) by the passageway and pipe 86, when the brake cylinder pressure in the chamber 84 (FIG. 1A) is built up sufficiently to deflect the diaphragm 78 upward against the yielding resistance of the spring 76 and the brake pipe pressure in the chamber 77, a spring 90 is rendered effective to seat valve 81 on its seat 82 whereupon further flow of fluid under pressure to the brake cylinder 2 is at a restricted rate determined by the size of a choke 91 that provides a bypass communication between chambers 85 and 84 while the valve 81 is seated on its seat 82. In actual practice, as in heretofore constructed railway freight car brake control valve devices, the choke 91 has a diameter of 0.09375 inch.

The combined emergency and brake pipe vent valve device 29 comprises an annular diaphragm 92, the outer periphery of which is clamped between the casing sections 22 and 23. The inner periphery of this diaphragm 92 is clamped between an annular diaphragm follower 93 that rests against a collar 94 that is formed integral with a spool-type valve 95 and an annular diaphragm follower plate 96 by a nut 97 that has screw-threaded engagement with external screw threads provided therefor on a stem that is integral with the collar 94.

The diaphragm 92 cooperates with the casing sections 22 and 23 to form on the respective opposite sides of this diaphragm 92 a pair of chambers 98 and 99.

Opening into the chamber 98 is one end of a passageway 100 that extends through the casing section 22 and at its opposite end opens into the hereinbefore-mentioned passageway 66 which is connected to the quick action chamber 36 (FIG. 1B) via chamber 63 (FIG. 1A), passageway 67, chamber 34 and passageway 35. Opening into the chamber 99 is one end of a passageway 101 that extends through the casing sections 23 and 22 and at its other end opens into the chamber 51.

Opening into the passageway 100 intermediate the ends thereof is one end of a passageway 102 that extends through the casing section 22 and at its opposite end opens at the wall surface of the bottomed bore 40. Therefore, the chamber 99 is connected to the quick action chamber 36 (FIG. 1B) via passageway 101 (FIG. 1A), chamber 51, hollow cylindrical member 48, bottomed bore 40, passageways 102, 100 and 66, chamber 63, passageway 67, chamber 34 and passageway 35. Thus, both the upper and the lower side of the diaphragm 92 are normally subject to the pressure in the quick action chamber 36 (FIG. 1B).

As shown in FIG. 1A, the spool valve 95 extends through a bore 103 in the casing section 23. This bore 103 opens at its upper end into the chamber 99 and at its lower end within an annular chamber 104 into which opens one end of a first passageway 105. This passageway 105 extends through the casing section 23 and is open to atmosphere via a dished circular shield 106.

The shield 106 is preferably formed of a resilient material, such as rubber, and is held in place, in which its outer periphery rests against a conical surface 107 on an insect excluder device 108, by any suitable means, such as, for example, a rivet 109 that extends through a bore in this insect excluder device.

Also opening into the annular chamber 104 is one end of a second passageway 110 that extends through the casing sections 23 and 22 and at its opposite end opens into a chamber 111 in the casing section 22. A quick action chamber breather choke 112 controls flow of fluid under pressure into the chamber 111 from one end of a passageway 113 that extends through the casing section 22 and bushing 42 and at its other end opens into the hereinbefore-mentioned bore 43 in bushing 42 just above the upper annular valve seat 38 that is formed at the lower end of this bore 43.

As shown in FIG. 1A, opening into the passageway 110 intermediate the ends thereof is one end of a passageway 114 that extends through the casing section 22, bushing 42 and bushing 46 and opens at its other end into the interior of this bushing 46 at such a location that, while the spring 49 biases the flange 47 against the lower end of the bushing 46, one of a pair of O-ring seals 115 carried in a pair of spaced-apart peripheral annular grooves on the hollow cylindrical member 48 is above this opening of the passageway 114 and the other O-ring seal is below this opening. Therefore, while the member 48 occupies the position shown in FIG. 1A, the upper O-ring seal 115 prevents leakage of fluid under pressure from the chambers 51 and 99 into the passageway 114, and the lower O-ring seal 115 prevents leakage of fluid under pressure from the bottomed bore 40, chamber 98 and quick action chamber 36 (FIG. 1B) into this passageway 114 which is open to atmosphere via passageway 110, chamber 104, passageway 105 and past the shield 106.

The diameter of the above-mentioned quick action chamber breather choke 112 in actual practice is 0.0810 inch, as in heretofore constructed railway freight car brake control valve devices. Therefore, when the valve 37 is unseated from the valve seat 38 in a manner hereinafter described, fluid under pressure will flow from the chamber 56 and the quick action chamber 36 (FIG. 1B) to atmosphere at a service rate simultaneously as fluid under pressure is released from the chamber 54 and the brake pipe 1 at a service rate to prevent operation of the combined emergency and brake pipe vent valve device 29 to effect an emergency brake application.

As shown in FIG. 1A, formed on the casing section 23 and in surrounding relation to the lower end of the chamber 104 is an annular valve seat 116 that is coaxial with a counterbore 117 in the casing section 23. Opening into the upper end of this counterbore 117 is one end of a passageway 118 that extends through the casing section 23 to the gasket face 88 on this casing section where it registers with a port in the ported gasket 89 (FIG. 1B). This port in the gasket 89 establishes a communication between the passageway 118 in the casing section 23 and a passageway in the pipe bracket 8 that corresponds to the passageway 37 shown in the hereinbefore-mentioned U.S. Pat. No. 3,232,678. As shown in FIG. 1 of this patent, fluid under pressure is supplied from the brake pipe to this passageway 37 (in the patent). Accordingly, it is apparent that fluid under pressure is supplied from the brake pipe 1 to the passageway 118 (FIG. 1A).

As shown in FIG. 1A, slidably mounted in the counterbore 117 is a cup-shaped vent valve guide 119 to which a vent valve 120 constructed of some resilient material, such as, for example, rubber, is secured as by bonding. The vent valve 120 is normally biased against the valve seat 116 by a spring 121 that is interposed between the vent valve guide 119 and a lower cover member 122 that is secured by any suitable means (not shown) to the lower end of the casing section 23.

It will be noted from FIG. 1A that the lower end of the spool valve 95 abuts the vent valve guide 119 and that intermediate its ends this spool valve is provided with an elongated peripheral annular groove 123 above which is a peripheral annular groove in which is carried an O-ring seal 124 and below which is a pair of spaced-apart peripheral annular grooves in each of which is carried an O-ring seal 124.

It will be further noted that while the spool valve 95 occupies the position in which it is shown in FIG. 1A, the two lower O-ring seals 124 carried on this valve 95 form a seal with the wall surface of the bore 103 at locations that are respectively above and below the location at which one end of a passageway 125 opens at this wall surface. This passageway 125 extends through the casing section 23 and opens into the passageway 87 intermediate the ends thereof.

Moreover, while the spool valve 95 occupies the position shown in FIG. 1A, the upper and center O-ring seals 124 carried on this valve 95 form a seal with the wall surface of the bore 103 at locations that are respectively above and below the location at which one end of a passageway 126 opens at this wall surface. As shown in FIGS. 1A and 1B, this passageway 126 extends through the casing sections 23 and 22 and pipe bracket 8 and is connected by a correspondingly numbered pipe to the emergency reservoir 3.

As shown in FIG. 1A, the emergency accelerated release check valve device 30 comprises an annular valve seat 127 that surrounds one end of a passageway 128 that extends through the casing section 23 and at its opposite end opens into the passageway 125 intermediate the ends thereof. This check valve device 30 further comprises a disc-type valve 129 that is disposed in a chamber 130 formed between the casing sections 22 and 23 and a spring 131 also disposed in this chamber 130 and interposed between the casing section 22 and the valve 129 to normally bias this valve against its seat 127 to close communication between the passageway 128 and the chamber 130 into which opens the lower end of the hereinbefore-mentioned bore 73.

As shown in FIG. 1A, the emergency valve device 12 further comprises a quick action chamber blowdown check valve device 132 and a choke 133 in series therewith.

The check valve device 132 comprises an annular valve seat 134 against which a flat disc valve 135 is normally biased by a spring 136 that is interposed between this disc valve and the casing section 22. Opening within the annular valve seat 134 is one end of a short passageway 137 that extends through the top cover member 24 and at its opposite end opens into the hereinbefore-mentioned passageway 67 that is connected to the quick action chamber 36 (FIG. 1B) via chamber 34 and passageway 35. A chamber 138 below the disc valve 135 is connected to the hereinbefore-mentioned passageway 31 by a passageway 139 in which is disposed the choke 133 that controls the rate of flow of fluid under pressure from the quick action chamber 36 (FIG. 1B) and the chamber 98 (FIG. 1A) above the diaphragm 92 to the brake pipe 1.

The diameter of the quick action chamber blowdown choke 133 in actual practice is 0.0200 inch as in heretofore constructed railway freight car brake control valve devices to insure that the vent valve 120 will remain open a definite time, for example, one mintue, to provide transmission of quick action through the length of the train and to prevent release of an emergency brake application before the train comes to a stop.

In the event that the pressure in the quick action chamber 36 (FIG. 1A) becomes higher than that in the emergency reservoir 3, a check valve device 140 (FIG. 1A) is provided. As shown in FIG. 1A, this check valve device 140 comprises an annular valve seat 141 against which a flat disc valve 142 is normally biased by a spring 143 that is interposed between this disc valve 142 and the top cover member 24. Opening within the annular valve seat 141 is one end of a short passageway 144 that extends through the casing section 22 and at its opposite end opens into the hereinbefore-mentioned passageway 35. A choke 145 is disposed in this passageway 144 to control the rate of flow of fluid under pressure from the passageway 35 to a chamber 146 above the disc valve 142 into which chamber 146 opens one end of a passageway 147 that extends through the casing section 22 and at its other end opens into the hereinbefore-mentioned passageway 126 that is connected to the emergency reservoir 3 by the correspondingly numbered pipe, as shown in FIG. 1B.

OPERATION — FIGS. 1A AND 1B

Initial Charging

Let it be assumed that a railway freight car provided with the brake control valve device 5 shown in FIGS. 1A and 1B of the drawings has been coupled into a train of cars, and that a handle of an engineer's brake valve device (not shown) located on the locomotive coupled to the head end of the train is in its release position. Therefore, while the handle of the engineer's brake valve device is in its release position, this brake valve device will effect the supply of fluid under pressure to the train brake pipe and therefore to the brake pipe 1 to charge the train brake pipe to a preselected normal charged value which, for example, may be 70 pounds per square inch.

Fluid under pressure supplied to the brake pipe 1 will flow via the branch pipe 7 and combined cut-out cock and dirt collector 6 to the brake control valve device 5 to cause the service valve portion 11 of this control valve device 5 to operate in the usual well-known manner of railway freight car brake control valves to effect a release of fluid under pressure from the brake cylinder 2 thereby releasing the brakes on the car and to charge the emergency reservoir 3 and auxiliary reservoir 4 to the pressure carried in the brake pipe 1.

Fluid under pressure supplied to the brake pipe 1 will flow therefrom through the branch pipe 7 and combined cut-out cock and dirt collector 6 to a passageway 148 in the pipe bracket 8 and thence from this passageway 148 to: (1) the counterbore 117 (FIG. 1A) via the passageway 118, (2) the chamber 62 via a strainer device 149 (FIG. 1B), passageway 33, chamber 32, passageway 31 (FIG. 1A) and passageway 65, (3) chamber 54 from the chamber 62 via the passageway 64, (4) the chamber 138 from the passageway 31 via the passageway 139, and (5) the chamber 77 from the passageway 31 via the passageway 79.

Furthermore, fluid under pressure will flow from the passageway 31 at a restricted rate determined by the size of the choke 25 to the chamber 34 and thence to: (1) the quick action chamber 36 (FIG. 1B) via the passageway 35, (2) the chamber 63 (FIG. 1A) via the passageway 67, (3) the chamber 56 from the chamber 63 via the passageway 66, (4) the chamber 98 from the passageway 66 via the passageway 100, and (5) the chamber 99 from the passageway 66 via the passageways 100 and 102, bottomed bore 40, hollow cylindrical member 48, chamber 51, and passageway 101 to effect charging of the chambers 36, 63, 56, 98 and 99 to the normal pressure carried in the brake pipe 1.

It is apparent that with the pressure in the chambers 54 and 56 equal, the spring 50 is effective to seat valve 37 on upper valve seat 38, and with the pressures in the chambers 62 and 63 equal, the spring 68 is effective to seat the diaphragm valve 61 on the seat 69.

Assuming that no fluid under pressure is present in the brake cylinder 2 (FIG. 1B) at the time the freight car is coupled into the train, there is no flow of fluid under pressure from this brake cylinder 2 to the brake pipe 1 via the emergency accelerated release check valve device 30 and the emergency accelerated release valve device 27.

SERVICE APPLICATION

A service application of the brakes is initiated by effecting a gradual reduction in brake pipe pressure at a service rate in the usual well-known manner. The service portion 11 (FIG. 1B) of the brake control valve device 5 will operate in the usual manner of the service portion of heretofore known railway freight car brake control valve devices to effect the supply of fluid under pressure from the auxiliary reservoir 4 to the brake cylinder 2 to cause a service brake application on the freight car provided with this control valve device 5.

As the pressure in the brake pipe 1 is reduced at a service rate, the pressure in the chamber 54 (FIG. 1A) below the diaphragm 55 will be correspondingly reduced at a service rate.

Since the choke 25 restricts the rate of flow of fluid under pressure from the chambers 56, 63, 34 and quick action chamber 36 (FIG. 1B) to the brake pipe 1, it is apparent that as the pressure in the chamber 54 below the diaphragm 55 is thus reduced faster than the pressure in the chamber 56 above the diaphragm 55, a differential fluid pressure force is established which acts in a downward direction to deflect diaphragm 55 downward and thereby effect shifting of stem 52 downward.

As the stem 52 is thus shifted downward, it will unseat valve 37 from upper valve seat 38 against the yielding resistance of the spring 50 without moving the lower side of this valve 37 into seating engagement with the lower valve seat 39.

Upon the unseating of the valve 37 from the upper valve seat 38, fluid under pressure will flow from the chamber 56 above the diaphragm 55 and the quick action chamber 36 to atmosphere via passageway 35, chamber 34, passageway 67, chamber 63, passageway 66, 100 and 102, bottomed bore 40, hollow cylindrical member 48, past lower valve seat 39, chamber 51, past upper valve seat 38, bore 43, passageway 113, choke 112, chamber 111, passageway 110, chamber 104, passageway 105 and past shield 106 of insect excluder device 108 at a rate determined by the size of the choke 112.

As hereinbefore stated, this choke 112 has a diameter of 0.0810 inch which diameter enables fluid under pressure to be released from the chamber 56 above diaphragm 55 and quick action chamber 36 to atmosphere at the same rate as fluid under pressure is being released from the chamber 54 below the diaphragm 55. This enables the pressure differential on the diaphragm 55 to be substantially destroyed so that this diaphragm 55 is not further deflected in a downward direction.

Consequently, the valve 37 is not shifted downward into seating contact with the lower valve seat 39.

Accordingly, fluid under pressure will flow from the chamber 98 above the diaphragm 92 to atmosphere via passageway 100 and 102, bottomed bore 40, hollow cylindrical member 48, past lower valve seat 39, chamber 51, past upper valve seat 38, bore 43, passageway 113, choke 112, chamber 111, passageway 110, chamber 104, passageway 105 and past shield 106 simultaneously as fluid under pressure flows from the chamber 99 below this diaphragm 92 to atmosphere via passageway 101, chamber 51 and the pathway described above. Therefore, the combined emergency and brake pipe vent valve device 29 is rendered inoperative to cause an emergency brake application.

SERVICE LAP

When the release of fluid under pressure from the train brake pipe is terminated, it is apparent that the release of fluid under pressure from the quick action chamber 36 (FIG. 1B) is likewise terminated.

When the release of fluid under pressure from the brake pipe 1 is terminated, the service valve device 11 will move to a lap position to cut off flow of fluid under pressure from the auxiliary reservoir 4 to the brake cylinder 2.

EMERGENCY APPLICATION

To effect an emergency application of the brakes, fluid under pressure is suddenly vented at a rapid rate from the brake pipe 1. Upon this reduction of pressure in the brake pipe 1, the service valve device 11 will operate to supply fluid under pressure from the auxiliary reservoir 4 (FIG. 1B) to the passageway 87 (FIG. 1A).

Moreover, the emergency valve device 12 operates in the manner explained above to release fluid under pressure from the chamber 56 and quick action chamber 36 (FIG. 1B) to atmosphere via the choke 112. This rate of release of fluid under pressure from the chamber 56 above the diaphragm 55 is less than the emergency rate of release of fluid under pressure from the chamber 54 below this diaphragm 55 via the brake pipe 1.

Therefore, it is apparent that a differential of pressure is quickly established on the diaphragm 55 which acts in a downward direction to deflect this diaphragm downward and thereby shift the stem 52 and valve 37 downward.

As the stem 52 is thus further shifted in a downward direction, it will effect seating of the lower side of the poppet valve 37 on the lower valve seat 39.

Upon this seating of the valve 37 on lower valve seat 39, fluid under pressure will no longer flow from the chamber 98 at the upper side of the diaphragm 92 and the quick action chamber 36 to atmosphere via passageways 100 and 102 and the pathway described above. Consequently, the fluid under pressure thus trapped in the chamber 98 will deflect diaphragm 92 and move the spool valve 95 and vent valve 120 downward so that this valve 120 is unseated from valve seat 116.

When the vent valve 120 is thus unseated from its seat 116, the brake pipe passageway 118 is open to atmosphere via chamber 104, passageway 105 and shield 106. With this communication established, fluid under pressure is suddenly vented from the brake pipe 1 at an emergency rate for the purpose of serially transmitting an emergency rate of reduction of pressure in the train brake pipe extending through the train in the usual well-known manner.

As the stem 52 is shifted in a downward direction subsequent to the seating of the valve 37 on the lower valve seat 39, the O-ring seal 53 on the stem 52 is moved downward to a position in which it forms a seal with the wall surface of the bore 43 at a location that is below the location at which the hereinbefore-mentioned other end of the passageway 113 opens at the wall surface of this bore 43. Therefore, flow of fluid under pressure from the chambers 99 and 51 to atmosphere via the quick action chamber breather choke 112 is cut off.

However, as the stem 52 is shifted in a downward direction subsequent to the seating of the valve 37 on the lower valve seat 39 which is formed on the upper end of the hollow cylindrical member 48, the valve 37 and this cylindrical member 48 will be shifted in a downward direction until the diaphragm follower 57 abuts a stop surface 150 formed on the casing section 22.

When the cylindrical member 48 has been thus moved downward until the diaphragm follower 57 abuts the stop surface 150, the upper O-ring seal 115 will form a seal with the interior wall surface of the bushing 46 at a location that is below the location at which the hereinbefore-mentioned other end of the passageway 114 opens at this interior wall surface.

Therefore, fluid under pressure will now flow from the chamber 99 to atmosphere at an unrestricted rate in bypass of the choke 112 via the passageway 101, chamber 51, interior of the bushing 46 above the upper O-ring seal 115 carried by cylindrical member 48, passageways 114 and 110, chamber 104, passageway 105 and insect excluder device 108. By thus releasing fluid under pressure from the chamber 99 to atmosphere in bypass of the choke 112, the operation of the combined emergency and brake pipe vent valve device 29 is hastened.

As the diaphragm 92 is further shifted downward along with the spool valve 95, the groove 123 on this valve 95 is moved to a position in which it establishes a communication between the passageways 126 and 125 whereupon fluid under pressure will flow from the emergency reservoir 3 (FIG. 1B) to the passageway 87 (FIG. 1A) via pipe and passageway 126, groove 123, and passageway 125.

Fluid under pressure thus supplied to the passageway 87 from the emergency reservoir 3 combines with that supplied to this passageway 87 from the auxiliary reservoir 4 by operation of the service valve device 11 and flows therefrom to a pressure chamber (not shown) within the brake cylinder 2 via chamber 85, bore 83, chamber 84, and passageway and pipe 86.

The fluid under pressure thus supplied to the pressure chamber within cylinder 2 will act on one side of the piston (not shown) therein and move this piston outward against the yielding resistance of the brake cylinder release spring (not shown) that acts on the other side of this piston. As this piston is thus moved, it increases the volume of the pressure chamber to which fluid under pressure is being supplied from the chamber 84 (FIG. 1A) below the diaphragm 78.

It will be noted that when an emergency brake application is made, all fluid under pressure is vented from the chamber 77 above the diaphragm 78. Therefore, as the pressure in the chamber 84 is increased, this diaphragm 78 is deflected upward against the yielding resistance of the spring 76, the strength of which may be such that when the pressure in the pressure chamber within the brake cylinder 2 (FIG. 1B) has increased to fifteen pounds per square inch, the pressure in the chamber 84 (FIG. 1A) below the diaphragm 78 will be of sufficient value to deflect this diaphragm 78 in an upward direction until the spring 90 seats the valve 81 on the annular valve seat 82 thereby closing off the rapid flow of fluid under pressure to the brake cylinder 2 by way of the annular valve seat 82. With the valve 81 thus seated on valve seat 82, fluid under pressure continues to flow from the chamber 85 to the brake cylinder 2 (FIG. 1B) via the choke 91 (FIG. 1A), chamber 84 and passageway and pipe 86 (FIG. 1B), the choke 91 forming a by-pass communication around the valve 81 which is now seated on the valve seat 82. The choke 91 provides for the second stage of increase in brake cylinder pressure at a slower rate. The pressure in the brake cylinder 2 will now continue to build up at this slower rate determined by the size of the choke 91 until equalization of the pressure in the auxiliary reservoir 4, emergency reservoir 3 and brake cylinder 2 occurs.

From the foregoing, it is apparent that the emergency valve device 12 of the brake control valve device 5 provides a two-stage buildup of pressure in the brake cylinder 2.

Since fluid under pressure is supplied from both the auxiliary reservoir 4 and the emergency reservoir 3 to the brake cylinder 2 when an emergency brake application is effected, it is apparent that a higher pressure is obtained in the brake cylinder 2 than is the case when a service brake application is effected.

It will be noted that the fluid under pressure trapped in the chamber 98 above the diaphragm 92 and in the quick action chamber 36 upon seating of the valve 37 on the lower valve seat 39 in the manner described above may flow to the brake pipe 1 via the passageway 137, check valve 135, chamber 138, choke 133, passageways 139 and 31, chamber 32 (FIG. 1B), passageway 33, strainer device 149, passageway 148, combined cut-out cock and dirt collector 6 and branch pipe 7.

Since all fluid under pressure is released from the brake pipe 1 to atmosphere whenever an emergency brake application is effected, it is apparent that all fluid under pressure present in the chamber 98 (FIG. 1A) above the diaphragm 92 will be released to atmosphere via the choke 133 and the brake pipe 1, it being noted that the size of this choke 133 is such as to prevent the vent valve spring 121 from reseating the vent valve 120 on its seat 116 until a sufficient period of time has elapsed as is necessary for the emergency brake application to bring the train to a stop.

When all fluid under pressure is released from the quick action chamber 36 (FIG. 1B) and the brake pipe 1 and, therefore, from the chambers 56, 98, 63, 34, 54, 62 and 77 (FIG. 1A) the diaphragms 55, 92 and 78 and diaphragm valve 61 will return to the position shown in FIG. 1A.

RELEASE OF THE BRAKES AFTER AN EMERGENCY APPLICATION

To effect a release of the brakes after an emergency application, fluid under pressure is supplied to the brake pipe 1 from whence it flows to the chamber 62 below the diaphragm valve 61, the chamber 54 below the diaphragm 55, and the chamber 77 above the diaphragm 78.

Moreover, fluid under pressure flows from the brake pipe 1 to the chamber 16 (FIG. 1B) above the diaphragm 15 in the service valve device 11 at a restricted rate determined by the size of a choke 151.

It will be noted from FIGS. 1A and 1B of the drawings that fluid under pressure flows at an unrestricted rate to the chambers 54 and 62 in the emergency valve device 12 since there are no chokes in the passageways 31, 79, 65 and 64.

Furthermore, it will be noted from FIG. 1A that the choke 25 restricts the rate of flow of fluid under pressure from the passageway 31 to the chamber 34, the chamber 63 above the diaphragm valve 61, the chamber 56 above the diaphragm 55, the chamber 98 above the diaphragm 92 and the quick action chamber 36 (FIG. 1B). Accordingly, it is apparent that the pressure in the chamber 54 below the diaphragm 55 will increase more rapidly than will the pressure in the chamber 56 above this diaphragm.

Moreover, it is apparent that the more rapid rate of increase of pressure in the chamber 54 quickly establishes a fluid pressure differential force which is effective to deflect the diaphragm 55 upward as viewed in FIG. 1A, and move the valve stem 52 upward to the position shown in FIG. 1A.

As the valve stem 52 is thus moved upward, the spring 49 will shift the cylindrical member 48, valve seat 39 and valve 37 upward until the flange 47 on member 48 abuts the lower end of the bushing 46.

As the valve stem 52 continues to be moved upward, the spring 50 will unseat valve 37 from the lower seat 39 and thereafter shift it upward until it seats on the valve seat 38.

With the valve 37 seated on the valve seat 38, fluid under pressure from the quick action chamber 36 (FIG. 1B) will flow to the chamber 99 below the diaphragm 92 via passageway 35, chamber 34, passageway 67, chamber 63, passageways 66, 100 and 102, bottomed bore 40, hollow cylindrical member 48, chamber 51 and passageway 101.

Since the passageway 100 is connected to chamber 98 above the diaphragm 92, it is apparent that the chambers 98 and 99 are quickly charged to the pressure present in the quick action chamber 36 (FIG. 1B) which is charged to the normal fully charged pressure carried in the brake pipe 1 via the quick action chamber charging choke 25.

Upon the supply of fluid under pressure to the brake pipe to effect a release of an emergency application, fluid under pressure will flow without restriction from brake pipe 1 to the chamber 62 below diaphragm valve 61 via branch pipe 7, combined cut-out cock and dirt collector 6, passageway 148, strainer device 149, passageway 33, chamber 32, passageway 31 and passageway 65. Simultaneously, fluid under pressure will flow from the passageway 31 to the chamber 63 above diaphragm valve 61 via the choke 25, chamber 34 and passageway 67. Consequently, the pressure in the chamber 62 will increase more rapidly than the pressure in the chamber 63. Therefore, when this upwardly acting fluid pressure differential force is sufficient to overcome the resistance of the spring 68, the diaphragm valve 61 will be unseated from its seat 69.

When diaphragm valve 61 is thus unseated from its seat 69, fluid under pressure will flow from the brake cylinder 2 (FIG. 1B), and the auxiliary reservoir 4 connected thereto via the service valve device 11 which is still in its service application position to the brake pipe 1 via pipe and passageway 86, chamber 84 (FIG. 1A), past valve seat 82 and through choke 91, chamber 85, passageways 87, 125, and 128, past valve seat 127, check valve 129 being unseated against the yielding resistance of the spring 131, chamber 130, passageway 73, counterbore 72, hollow cylindrical valve member 70, past valve seat 69, chamber 62, passageways 65 and 31, chamber 32 (FIG. 1B), passageway 33, strainer device 149, the passageway 148 in the pipe bracket 8, combined cut-out cock and dirt collector 6 and branch pipe 7.

The above-mentioned flow of fluid under pressure from the brake cylinder 2 and auxiliary reservoir 4 to the brake pipe 1 accelerates the rate of recharge of the brake pipe. This action naturally occurs first at the head end of the train when the increase in brake pipe pressure is first effected, and the sudden increase in brake pipe pressure on one car causes the emergency valve device on the next car to function in the same manner, so that this back dump operation is rapidly transmitted serially from car to car throughout the length of the train.

It will be noted from FIG. 1A that some of the fluid under pressure supplied from the brake cylinder 2 and auxiliary reservoir 4 to the passageway 31, in the manner described above, flows from this passageway 31 to the quick action chamber 36 (FIG. 1B) via choke 25, chamber 34 and passageway 35.

From the foregoing, it is apparent that fluid under pressure will flow from the brake cylinder 2 and auxiliary reservoir 4 to the brake pipe 1 until substantial equalization of pressures therebetween occurs, and also that fluid under pressure will flow through the choke 25 until the pressure in the chambers 63 and 56 and quick action chamber 36 (FIG. 1B) is substantially the same as the pressure in the chamber 62 and the brake pipe 1.

Upon equalization of pressure in chambers 56, 54, 63 and 62, the inherent resilience of the diaphragm 55 and diaphragm valve 61 returns this diaphragm 55 and diaphragm valve 61 to the position in which they are shown in FIG. 1A.

As the diaphragm valve 61 is thus moved downward to the position in which it is shown in FIG. 1A, the spring 68 is rendered effective to seat this diaphragm valve 61 on its seat 69 thereby closing communication between the brake cylinder 2 (FIG. 1B) and the brake pipe 1 and thus prevent further flow of fluid under pressure from the brake cylinder 2 to the brake pipe 1.

As fluid under pressure is supplied to the chamber 16 (FIG. 1B) in the manner described above, the resulting increase in pressure in this chamber 16 will deflect the diaphragm 15 downward to thereby return the graduating valve 19 and the service valve 20 of the service valve device 11 to the position shown. The fluid under pressure now remaining in the brake cylinder 2 will flow to atmosphere via pipe and passageway 86, chamber 84, past valve seat 82, choke 91 in parallel therewith, chamber 85, passageway 87, and passageways and ports in the service valve device 11 it being understood that these passageways and ports correspond to ports and passageways in the service valve device 7 of the brake control valve device 1 shown in hereinbefore-mentioned United States Patent No. 3,232,678 through which fluid under pressure may flow from the brake cylinder 7 shown in this patent to atmosphere.

With the release of all fluid under pressure from the brake cylinder 2 (FIG. 1A), the brakes on the car will be completely released.

Furthermore, the emergency reservoir 3 and the auxiliary reservoir 4 will now be charged from the brake pipe 1 to the normal fully charged train brake pipe pressure.

DESCRIPTION - FIG. 2

In FIG. 2 of the drawings, there is shown a partial diagrammatic view, in vertical cross section, of an emergency valve portion 152 constructed in accordance with a second embodiment of the invention. It will be understood that the right-hand end of this emergency valve portion 152 is shown in outline in FIG. 2 since the elements therein are identical to those of the emergency valve portion 12 shown in FIG. 1A. According to this second embodiment of the invention, the emergency valve portion 152 shown in FIG. 2 differs from the emergency valve portion 12 shown in FIG. 1A in that, while the brakes are released, the upper and lower sides of an annular diaphragm 153 that operates a combined emergency and brake pipe vent valve device 154 are subject to atmospheric pressure rather than the pressure in the quick action chamber 36 (FIG. 1B) as are the upper and lower sides of the diaphragm 92 of the combined emergency and brake pipe vent valve device 29 shown in FIG. 1A.

Moreover, a single valve seat 155 is provided for a flat disc valve 156 that corresponds to the disc valve 37 shown in FIG. 1A of the drawings. Accordingly, like reference numerals have been used to designate the structure shown in FIG. 2 which is identical to that shown in FIG. 1A. Only such features of the structure and operation of the embodiment of the invention shown in FIG. 2 which differ from that of the embodiment of FIG. 1A will be hereinafter described.

According to the embodiment of the invention disclosed in FIG. 2, the emergency valve portion 152 is identical to the emergency valve portion 12 shown in FIG. 1 except that the flat disc valve 156 shown in FIG. 2, which replaces the flat disc valve 37 shown in FIG. 1, has some suitable resilient material such as, for example, rubber bonded to only its lower side rather than to each side since only this lower side cooperates with the single valve seat 155.

As shown in FIG. 2 of the drawings, the emergency valve portion 152 comprises a combined quick action chamber breather and cut-off valve device 157, the above-mentioned combined emergency and brake pipe vent valve device 154, a quick action chamber charging choke (not shown) that is identical to the quick action chamber charging choke 25 shown in FIG. 1A, an emergency accelerated release valve device (not shown) that is identical to the emergency accelerated release valve device 27, an inshot valve device (not shown) that is identical to the inshot valve device 28 and an emergency accelerated release check valve device (not shown) that is identical to the emergency accelerated release check valve device 30.

As shown in FIG. 2, the combined quick action chamber breather and cut-off valve device 157 comprises the abovementioned flat disc valve 156 which is disposed in a chamber 158 provided in the casing section 22 below a bushing 159 that is press-fitted into the counterbore 41 in this casing section.

A spring 160 that is disposed in the chamber 158 and interposed between the bottom of this chamber and the lower side of the valve 156 biases this valve and a valve operating stem 161 that is slidably mounted in the bushing 159 in an upward direction. Intermediate its ends this stem 161 is provided with a peripheral annular groove in which is carried the O-ring seal 53 that forms a seal with the interior wall surface of the bushing 159 to prevent leakage between the chambers 158 and 54.

Formed integral with the upper end of the stem 161 is a diaphragm follower 162 between which and an annular diaphragm follower plate 163 is clamped a movable abutment in the form of a diaphragm valve 164 by a plurality of cap screws 165 and nuts 166 only two of which appear in FIG. 2, it being understood that these cap screws 165 extend through smooth coaxial bores provided therefor in the diaphragm follower plate 163, diaphragm valve 164 and diaphragm follower 162.

The outer periphery of the diaphragm valve 164 is clamped between the casing section 22 and a top cover member 167 that is secured to this casing section 22 by any suitable means (not shown).

As shown in FIG. 2, the spring 160 is normally effective via the valve 156, stem 161, and diaphragm follower 162 to bias the upper side of the diaphragm valve 164 against an annular valve seat 168 formed at one end of a passageway 169. This passageway 169 extends through the top cover member 167 and the casing section 22 and at its opposite end opens into a passageway 170 intermediate the ends thereof. This passageway 170 extends through the casing section 22 and at one end opens into the hereinbefore-mentioned chamber 158 via the valve seat 155 formed at this one end. The other end of this passageway 170 opens into a chamber 171 formed between the casing section 22 and the upper side of the hereinbefore-mentioned diaphragm 153, the outer periphery of which is clamped between the casing sections 22 and 23.

As shown in FIG. 2, the lower side of the diaphragm 153 cooperates with the casing section 23 to form a chamber 172 into which opens one end of a passageway 173 that extends through the casing sections 23 and 22 and at its other end opens into the chamber 158. This chamber 158 is constantly open to atmosphere via a passageway 174 that extends through the casing section 22 to the exterior thereof and has the quick action chamber breather choke 112 disposed in its outer end.

Referring to FIG. 2, it is apparent that the chamber 171 is normally open to atmosphere via passageway 170, chamber 158, passageway 174 and choke 112. Likewise, the chamber 172 is normally open to atmosphere via passageway 173, chamber 158, passageway 174 and choke 112.

The inner periphery of the above-mentioned annular diaphragm 153 is connected to the spool valve 95 by the diaphragm follower 93, diaphragm follower plate 96 and nut 97, as in the first embodiment of the invention.

OPERATION - FIG. 2 Initial Charging

The initial charging of the emergency portion 152 shown in FIG. 2 is the same as that for the emergency portion 12 shown in FIG. 1A except the chambers 171 and 172 on the respective opposite sides of the diaphragm 153 are not charged to the pressure in the quick action chamber which is the same as that carried on the train brake pipe but remain open to atmosphere.

It is apparent that with the pressure in the chambers 56 and 54 equal, the spring 160 is effective, via the valve 156, valve stem 161 and diaphragm follower 162, to bias the diaphragm valve 164 against the valve seat 168 to cut off flow of fluid under pressure from the chamber 56 to the passageway 169 which is open to atmosphere.

SERVICE APPLICATION

It may be assumed that the emergency portion 152 (FIG. 2) is secured to the left-hand side of the pipe bracket 8 shown in FIG. 1B in place of the emergency valve portion 12 shown in FIG. 1A, and that the service valve portion 11 is secured to the right-hand side of this bracket 8 to constitute a railway car brake control valve device.

A service application of the brakes is initiated in the same manner as hereinbefore described for the first embodiment of the invention.

Therefore, as the pressure in the train brake pipe is reduced at a service rate, the pressure in the chamber 54 below the diaphragm valve 164 will be correspondingly reduced at a service rate.

Since the flow of fluid under pressure from the chamber 56 is at a restricted rate via the choke 25 (FIG. 1A), a differential fluid pressure force is established which deflects diaphragm valve 164 downward thereby unseating it from valve seat 168 prior to movement of the valve 156 far enough to engage valve seat 155.

Upon the unseating of diaphragm valve 164 from valve seat 168, fluid under pressure will flow from the chamber 56 above this diaphragm valve 164 and the quick action chamber 36 (FIG. 1B) to atmosphere via passageways 169 and 170, chamber 158, passageway 174 and choke 112 at a rate determined by the size of this choke 112.

As in the first embodiment of the invention, the diameter of the choke 112 is .0810 inch which diameter enables fluid under pressure to be released from the chamber 56 above diaphragm valve 164 and the quick action chamber 36 (FIG. 1B) at the same service rate as fluid under pressure is being released from the brake pipe and the chamber 54 below this diaphragm valve 164. This enables the pressure differential on the diaphragm valve 164 to be substantially destroyed so that this diaphragm valve 164 is not further deflected in a downward direction to cause the valve 156 to be seated on valve seat 155. Therefore, the chambers 171 and 172 remain open to atmosphere and the combined emergency and brake pipe vent valve device 154 is rendered inoperative to cause an emergency brake application.

SERVICE LAP

When the release of fluid under pressure from the train brake pipe is terminated, the release of fluid under pressure from the quick action chamber 36 (FIG. 1B) is likewise terminated, and the service valve device 11 moves to its lap position, as in the first embodiment of the invention.

EMERGENCY APPLICATION

As in the first embodiment of the invention, when fluid under pressure is vented from the train brake pipe at an emergency rate, the service valve device 11 will operate to supply fluid under pressure from the auxiliary reservoir 4 (FIG. 1B) to the passageway 87 (FIG. 1A) it being understood that this passageway is connected to the brake cylinder 2 in the same manner as in the first embodiment of the invention.

Moreover, the emergency portion 152 will operate in the manner described above to release fluid under pressure from the chamber 56 above the diaphragm valve 164 and the quick action chamber 36 (FIG. 1B) to atmosphere via the choke 112. This rate of release of fluid under pressure from the chamber 56 above the diaphragm valve 164 is less than the emergency rate of release of fluid under pressure from the chamber 54 below this diaphragm valve 164.

Therefore, it is apparent that a differential of pressure is established on the opposite sides of the diaphragm valve 164 which is of sufficient magnitude to shift the valve stem 161 and valve 156 downward until this valve 156 is seated on the valve seat 155.

When the valve 156 is thus seated on the valve seat 155, the quick action chamber 36 (FIG. 1B) and the chamber 171 (FIG. 2) above the diaphragm 153 are cut off from atmosphere.

However, the chamber 172 below the diaphragm 153 remains connected to atmosphere via passageway 173, chamber 158, passageway 174 and the choke 112. Since the quick action chamber 36 (FIG. 1B) is now connected to the chamber 171 above the diaphragm 153, the fluid under pressure remaining in the quick action chamber 36 (FIG. 1B) and chamber 171 will deflect the diaphragm 153 downward to shift the spool valve 95 downward to unseat vent valve 120 from its seat 116 to vent fluid under pressure from the train brake pipe at an emergency rate.

This emergency rate of release of fluid under pressure from the brake pipe is serially transmitted through the train brake pipe to cause an emergency brake application to be effected on all the cars in the train.

When the spool valve 95 is shifted downward to its lower position, the groove 123 thereon will connect the passageway 126 to the passageway 125 which is connected to the passageway 87 (FIG. 1A).

Therefore, fluid under pressure supplied from the emergency reservoir 3 to the passageway 87 combines with that supplied to this passageway 87 from the auxiliary reservoir 4 by operation of the service valve device 11 and flows to the brake cylinder 2 as in the first embodiment of the invention.

RELEASE OF THE BRAKES AFTER AN EMERGENCY APPLICATION

When the train brake pipe is recharged subsequent to an emergency brake application, the emergency valve portion 152 (FIG. 2) will operate in substantially the same manner as hereinbefore described for the emergency valve portion 12 (FIG. 1A). Therefore, the emergency valve portion 152 and the service valve portion 11 will operate to effect a release of the emergency brake application in the same manner as described for the first embodiment of the invention.

Having now described the invention, what I claim as new and desire to secure by Letters Patent, is:

1. For use in a brake apparatus including a brake pipe, an auxiliary reservoir and an emergency reservoir each normally charged to a certain chosen pressure, a brake cylinder and a fluid-pressure-operated service valve device, a fluid-pressure operated emergency valve device operative in conjunction with said service valve device in response to a reduction of the pressure in the brake pipe at an emergency rate to effect the supply of fluid under pressure from said reservoirs to said brake cylinder to cause an emergency brake application and comprising:

a. a casing having therein a plurality of chambers, bores and passageways, one of said bores connecting a pair of said chambers and having an annular valve seat at one end and a pair of passageways opening at one end into said bore and one of said pair of chambers respectively and cooperating therewith to provide a communication through which fluid under pressure may be released from another chamber, other than said plurality of chambers, to atmosphere via said one chamber, b. a poppet-type valve which so cooperates with said annular valve seat as to control flow of fluid under pressure from said another chamber to atmosphere, c. choke means enabling the release of fluid under pressure from said another chamber at a service rate of reduction of brake pipe pressure, d. a movable abutment subject on its respective opposite sides to the pressure in said another chamber and the brake pipe, e. fluid-pressure-operated combined emergency and brake pipe vent valve means for effecting the supply of fluid under pressure from the emergency reservoir to the brake cylinder and the release of fluid under pressure from the brake pipe at an emergency rate, and f. means enabling said movable abutment to so control operation of said poppet-type valve in response to a reduction of pressure in the brake pipe at a service rate as to effect the release of fluid under pressure from said another chamber to atmosphere via said choke means at said service rate without effecting operation of said combined emergency and brake pipe vent valve means, and in response to a reduction of pressure in the brake pipe at an emergency rate to cut off the release of fluid under pressure from said another chamber to atmosphere and effect operation of said combined emergency and brake pipe vent valve means to release fluid under pressure from the brake pipe at an emergency rate and supply fluid under pressure from the emergency reservoir to the brake cylinder to cause an emergency brake application.

2. For use in a brake apparatus including a brake pipe, a quick action chamber, an auxiliary reservoir and an emergency reservoir each normally charged to a certain chosen pressure, a brake cylinder and a fluid-pressure-operated service valve device, a fluid-pressure-operated emergency valve device operative in conjunction with said service valve device in response to a reduction of the pressure in the brake pipe at an emergency rate to effect the supply of fluid under pressure from said reservoirs to said brake cylinder to cause an emergency brake application, said emergency valve device comprising:

a. restricted means enabling flow of fluid under pressure between the brake pipe and the quick action chamber to provide for charging the quick action chamber from the brake pipe, b. a combined emergency and brake pipe vent valve device comprising:
  i. a first valve means for effecting the supply of fluid under pressure from the emergency reservoir to the brake cylinder to effect an emergency brake application,
  ii. a second valve means for effecting the release of fluid under pressure from the brake pipe to atmosphere at an emergency rate, and
  iii. A movable abutment having a chamber on each of the respective opposite sides thereof and so operatively connected to said first and second valve means as to effect the simultaneous operation of said first and second valve means in response to the presence of fluid under pressure in one of said chambers and the absence of fluid under pressure in the other, c. a combined quick action chamber breather and cut-off valve device comprising:
  i. a pair of valve seats,
  ii. a pair of valves each for so cooperating with one of said valve seats as to enable flow of fluid under pressure from the quick action chamber to atmosphere while both are unseated, and
  iii. a movable abutment subject on its respective opposite sides to the pressure in the quick action chamber and the brake pipe and operative upon a service rate of reduction of pressure in the brake pipe to effect the unseating of one of said valves from its seat without effecting seating of the other of said valves on its seat, and operative upon an emergency rate of reduction of pressure in the brake pipe to effect the unseating of said one valve from its seat and the subsequent seating of the other valve on its seat to cut off flow of fluid under pressure from the quick action chamber to atmosphere, d. choke means enabling the release of fluid under pressure from the quick action chamber to atmosphere at a service rate of reduction of pressure in the brake pipe only which both of said valves are unseated from their respective seats, and e. conduit means so connecting the chambers at the respective opposite sides of the movable abutment of said combined emergency and brake pipe vent valve device to the respective opposite sides of said other valve seat as to subject said opposite sides of said abutment to the same pressure while said other valve is unseated from its seat to prevent operation of said combined emergency and brake pipe vent valve device and as to subject only one of said sides of said abutment to fluid under pressure while said other valve is seated on its seat to thereby effect operation of said valve device by the fluid under pressure on said one side.

3. The emergency valve device, as recited in claim 2, further characterized in that said first and second valve means of said combined emergency and brake pipe vent valve device are arranged in tandem, and said first valve means in a spool-type valve.

4. The emergency valve device, as recited in claim 2, further characterized in that said first and second valve means of said combined emergency and brake pipe vent valve device are arranged in tandem, and said second valve means is a poppet-type valve.

5. The emergency valve device, as recited in claim 2, further characterized in that said pair of valve seats are arranged in coaxial spaced-apart relationship, and said pair of valves comprises a disc coaxially disposed between said pair of valve seats and having on each side a seating surface for engagement with the adjacent valve seat when moved into seating engagement therewith.

6. The emergency valve device, as recited in claim 2, further characterized in that one of said pair of valve seats of said combined quick action chamber breather and cut-off valve device is movable, and said combined quick action chamber breather and cut-off valve device further comprises:

a. a stop for said movable valve seat,
b. means normally biasing said movable valve seat against said stop, and
c. second conduit means so arranged with respect to said choke means and said movable valve seat as to provide a bypass communication around said choke means upon movement of said movable valve seat away from said stop by one of said pair of valves upon movement of said pair of valves a chosen distance subsequent to unseating of the other of said pair of valves from the other of said pair of valve seats thereby enabling the release of fluid under pressure from one of said opposite sides of said abutment of said combined emergency and brake pipe vent valve device whereby fluid under pressure on the other side of said abutment effects operation of said combined emergency and brake pipe vent valve device to cause an emergency brake application.

7. The emergency valve device, as recited in claim 6, further characterized by a third conduit means enabling one side of said movable abutment of said combined quick action chamber breather and cut-off valve device and both sides of said movable abutment of said combined emergency and brake pipe vent valve device to be normally subject to the pressure in the quick action chamber to enable fluid under pressure in the quick action chamber to effect operation of said combined emergency and brake pipe vent valve device upon said release of fluid under pressure from said one side of said abutment of said combined emergency and brake pipe vent valve device.

8. The emergency valve device, as recited in claim 6, further characterized by a third conduit means enabling one side of said movable abutment of said combined quick action chamber breather and cut-off valve device and both sides of said movable abutment of said combined emergency and brake pipe vent valve device to be normally subject to the pressure in the quick action chamber whereby, upon a reduction of the pressure in the brake pipe at an emergency rate on one side of said movable abutment of said combined quick action chamber breather and cut-off valve device, the pressure in the quick action chamber acting on the other side of said movable abutment is rendered effective to cause said movable abutment to effect shifting of the seating surface on one side of said disc out of seating engagement with one of said pair of valve seats and the seating of the seating surface on the other side of said disc into seating engagement with the other of said pair of valve seats to enable cut off of the quick action chamber from one side of said movable abutment of said combined emergency and brake pipe vent valve device whereby subsequent shifting of said other valve seat by said disc effects the release of fluid under pressure from said one side of said movable abutment of said combined emergency and brake pipe vent valve device thereby enabling quick action chamber pressure acting on the other side of this movable abutment to cause said abutment to operate said combined emergency and brake pipe vent valve device to effect an emergency brake application.

9. For use in a brake apparatus including a brake pipe, a quick action chamber, an auxiliary reservoir and an emergency reservoir each normally charged to a certain chosen pressure, a brake cylinder and a fluid-pressure-operated service valve device, a fluid-pressure-operated emergency valve device operative in conjunction with said service valve device in response to a reduction of the pressure in the brake pipe at an emergency rate to effect the supply of fluid under pressure from said reservoirs to said brake cylinder to cause an emergency brake application, said emergency valve device comprising:
  a. restricted means enabling flow of fluid under pressure between the brake pipe and the quick action chamber to provide for charging the quick action chamber from the brake pipe,
  b. a combined emergency and brake pipe vent valve device comprising:
    i. a first valve means for effecting the supply of fluid under pressure from the emergency reservoir to the brake cylinder to effect an emergency brake application,
    ii. a second valve means for effecting the release of fluid under pressure from the brake pipe to atmosphere at an emergency rate, and
    iii. a movable abutment having a chamber on each of the respective opposite sides thereof and so operatively connected to said first and second valve means as to effect the simultaneous operation of said first and second valve means in response to the presence of fluid under pressure in one of said chambers and the absence of fluid under pressure in the other,
  c. a combined quick action chamber breather and cut-off valve device comprising:
    i. a pair of coaxial spaced-apart valve seats,
    ii. a first conduit means connecting said pair of valve seats,
    iii. a disc valve for engaging one of said valve seats,
    iv. a diaphragm valve for engaging the other of said valve seats and subject on its respective opposite sides to the pressure in the quick action chamber and the brake pipe and operative upon reduction of pressure in the brake pipe to disengage said other valve seat, and
    v. means so connecting said diaphragm valve and said disc valve as to enable said diaphragm valve to disengage said other valve seat without moving said disc valve into engagement with said one valve seat,
  d. choke means enabling the release of fluid under pressure from the quick action chamber to atmosphere via said first conduit means at a service rate of reduction of pressure in the brake pipe only while said disc valve and said diaphragm valve are disengaged from their respective seats, and
  e. second conduit means so connecting said one and said other chamber at the respective opposite sides of said movable abutment of said combined emergency and brakepipe vent valve device to the respective opposite sides of said one valve seat as to connect said one and said other chamber to atmosphere while said diaphragm valve engages said other valve seat, said one and said other chamber to the quick action chamber while said diaphragm valve and disc valve are each unseated from their respective seats, and said one chamber to the quick action chamber and said other chamber to atmosphere while said disc valve engages said one valve seat whereby the pressure acting in said one chamber effects operation of said combined emergency and brake pipe vent valve device to cause an emergency brake application,
  f. said choke means so restricting flow of fluid under pressure from the quick action chamber and one side of said diaphragm valve to atmosphere upon an emergency rate of reduction of brake pipe pressure on the other side of said diaphragm valve as to establish sufficient differential of pressure on said diaphragm valve as to enable it via said connecting means to shift said disc valve into engagement with said one valve seat.

10. The emergency valve device, as recited in claim 9, further characterized in that said choke means is disposed on the downstream side of said one valve seat.

* * * * *